(12) United States Patent
Ohara

(10) Patent No.: US 7,980,280 B2
(45) Date of Patent: Jul. 19, 2011

(54) PNEUMATIC TIRE WITH TREAD INCLUDING RIBS HAVING CLOSED SIPES

(75) Inventor: Masaaki Ohara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 906 days.

(21) Appl. No.: 11/862,251

(22) Filed: Sep. 27, 2007

(65) Prior Publication Data

US 2008/0099115 A1    May 1, 2008

(30) Foreign Application Priority Data

Oct. 27, 2006   (JP) ................. 2006-293224

(51) Int. Cl.
*B60C 11/04* (2006.01)
*B60C 11/12* (2006.01)
(52) U.S. Cl. ........ 152/209.17; 152/209.18; 152/DIG. 3; 152/901
(58) Field of Classification Search ............. 152/209.17, 152/209.18, DIG. 3, 900, 901
See application file for complete search history.

(56) References Cited

U.S. PATENT DOCUMENTS
2007/0151646 A1 * 7/2007 Ito

FOREIGN PATENT DOCUMENTS

| JP | 03-153401 | * | 7/1991 |
|---|---|---|---|
| JP | 07-115571 | * | 12/1995 |
| JP | 08-192607 |   | 7/1996 |
| JP | 10-264609 |   | 10/1998 |
| JP | 2005-035328 | * | 2/2005 |
| JP | 2005-132267 |   | 5/2005 |

OTHER PUBLICATIONS

Machine translation for Japan 07-115571 (no date).*

* cited by examiner

*Primary Examiner* — Steven D Maki
(74) *Attorney, Agent, or Firm* — Fish & Richardson P.C.

(57) ABSTRACT

A pneumatic tire having improved wear resistance, especially improved uneven wear resistance (such as river wear), is offered. The tire that is a rib-pattern tire has five ribs extending circumferentially of the tire. The ribs include a center rib and intermediate ribs located on the opposite sides of the center rib that is located on the equator line of the tire. Closed sipes are formed at least in the center rib and in the intermediate ribs. Each sipe is located in the lateral center of the corresponding rib. Both ends of each sipe terminate within the corresponding rib. The closed sipes are successively offset circumferentially among the ribs and arranged in a periodic pattern on the outer surface of the tire. The closed sipes in the ribs are so arranged that when they are optically projected onto the equator line of the tire, the sipes do not overlap circumferentially of the tire among the ribs.

7 Claims, 3 Drawing Sheets

PNEUMATIC TIRE WITH TREAD INCLUDING RIBS HAVING CLOSED SIPES

BACKGROUND OF THE INVENTION

1. Field of the Invention

The present invention relates to a pneumatic tire having a rib pattern and, more particularly, to a pneumatic tire using ribs having improved wear resistance. Still particularly, the invention relates to a pneumatic tire designed to prevent uneven wear.

2. Description of the Related Art

Main types of uneven wear of a pneumatic tire having a rib pattern are (1) step wear starting from the end of the tire in the direction of the axis of rotation of the tire, the end touching the road surface, and (2) river wear produced in rib ends on both sides of each circumferential groove. Especially, there has been the problem that river wear that is uneven wear produced locally in the circumferential direction of the rib ends is caused easily.

In the past, the above-described step wear, or one kind of uneven wear, has been effectively prevented by forming thin circumferential grooves near the road-contacting shoulder ends of the tire tread. With respect to river wear, a technique of forming multiple short sipes in rib ends circumferentially of the tire at close intervals is known. One end of each of the sipes opens into a circumferential groove.

The process in which the river wear is produced is understood as follows. First, minute steps are formed on the rib ends by lateral forces produced during operation of the tire. Slippage is produced across the steps due to variations in radial diameter, increasing the steps in the lateral direction. The increased steps are grown into the above-described uneven wear. It is quite important to prevent local wear on the rib ends, in order to suppress eruption of river wear. Satisfactory results cannot be obtained only if the short sipes are disposed.

A technique of preventing uneven wear of a rib pattern is disclosed, for example, in JP-A-10-264609. In particular, a tread is partitioned into shoulder ribs on both sides, second ribs located inside the shoulder ribs, and a single center rib located between the second ribs. Generation of rib tears and sipe tears is prevented by limiting the relative widths of the ribs. The progress of uneven wear from the shoulder edges can be hindered even if the wear is in its middle stage or later.

JP-A-2005-132267 proposes a pneumatic tire having excellent wear resistance, uneven wear resistance, and gripping capabilities. The tire has main grooves and thin grooves extending circumferentially while being bent right and left with uniform amplitude. The left and right ribs are circumferentially and axially siped. The tread width is set greater than 0.70 times the tire width. Thus, the relationships of the tread width with the main and thin grooves are stipulated.

JP-A-8-192607 describes a heavy-duty pneumatic tire having excellent uneven wear resistance and wet skidding resistance. The tire has plural zigzag main grooves extending circumferentially and lands partitioned by the main grooves. The lands form rows of multiple blocks split by open sipes. The lands also have closed sipes both ends of each of which terminate inside the blocks.

However, the pneumatic tire relying on the above-described related art can have improved gripping capabilities and steering stability because the ribs are split by each open sipe whose both ends open into the main grooves. However, the rigidity of the ribs tends to vary, and the road holding capability deteriorates. Shearing force produced around the sipes tends to be concentrated in the openings of the sipes at the rib ends. This creates increased strain. As a result, deformation easily occurs. Wear starts from the location where the strain is produced, resulting in cracks. Hence, there is the problem that uneven wear tends to be produced easily.

SUMMARY OF THE INVENTION

It is an object of the present invention to provide a pneumatic tire which has tread ribs whose rigidity is prevented from varying during operation of the tire and which has improved road holding capability to thereby improve the wear resistance of the rib pattern of the tire, whereby eruption of uneven wear such as river wear is especially suppressed.

To achieve this object, the present invention provides a pneumatic tire including a tread surface having five ribs partitioned by four main grooves which extend continuously circumferentially of the tire. The ribs include a center rib and intermediate ribs located on the opposite sides of the center rib that is located on the tire's equator line. Closed sipes are formed on the outer surface of the tire. The closed sipes are formed at least in the lateral centers of the ribs. Both ends of each closed sipe terminate within the corresponding rib. The closed sipes are successively offset at given intervals circumferentially among the ribs. The closed sipes are so arranged that when the sipes in the ribs are optically projected onto the equator line of the tire, the sipes do not overlap circumferentially of the tire among the ribs.

Preferably, in one repeating unit of the periodic pattern of the closed sipes, the sum of the circumferential lengths of regions where the closed sipes do not overlap circumferentially of the tire among the ribs is 20% or less of the length of the one repeating unit of the pattern of the closed sipes.

In this structure, the closed sipes are spaced circumferentially from each other among the ribs. The rigidity of the ribs within the tread surface can be made uniform by setting the interval between the sipes to a small value. Thus, the road holding capability can be improved. Consequently, uniform wear can be achieved.

Uneven wear of the rib pattern is understood as follows. During operation, when shearing force or slipping force consisting mainly of lateral stress acts on the ribs, the ends of the ribs move more than the other portions within the tread surface, resulting in local wear. The local wear is extended circumferentially along the rib edges. The ribs according to the present invention reduce circumferential variations in rigidity because any block created by open sipes does not exist. Furthermore, the closed sipes improve the road holding capability of the ribs. Excessive motion within the tread surface is reduced. Consequently, uneven wear can be suppressed.

Furthermore, in the pneumatic tire according to the invention, the closed sipes are formed in regions of 20 to 30% of the actual width of the ribs. The ratio of the length of each closed sipe as measured circumferentially of the tire to the length as measured width of the tire (circumferential length/lateral length) is in a range of from 1 to 2. Thus, circumferential variations in rigidity within the tread surface are suppressed. As a result, the road holding capability can be made uniform. In addition, the road holding capability of the ribs is improved, because the closed sipes are disposed in the plural ribs. Where the closed sipes are formed in regions exceeding 30% of the actual width of the ribs, the closed sipes open axially of the tire. This will form a starting point of wear. More preferably, the circumferential interval between the closed sipes in the ribs is set to 3 to 4 times the length of the sipes. Consequently, the spaces between the sipes act to mitigate deformation of the ribs, as well as the regions where the closed sipes are disposed. This reduces and makes uniform the contact pressure of the ribs on the road in front and behind the closed sipes circumferentially. In consequence, the wear resistance is improved.

Additionally, in the pneumatic tire according to the invention, all the closed sipes are preferably tilted in the same direction relative to the circumferential direction of the tire in the ribs. If the sipes were tilted in different directions, the contact pressure of the ribs on the road would be increased, and the wear resistance would be deteriorated.

Further, in the pneumatic tire according to the invention, the closed sipes are successively offset circumferentially of the tire in the direction in which the outermost-layer belt cords of the tire extend in one repeating unit of the periodic pattern of the closed sipes. The line connecting both ends of each sipe intersects the direction in which the outermost-layer belt cords extend. Therefore, when air is introduced into the tire to create an inside pressure, the spacing between the belt cords tends to spread. Because of this action, the closed sipes are suppressed from being opened. This secures rigidity of the ribs. Furthermore, eruption of cracks can be suppressed.

DETAILED DESCRIPTION OF THE PREFERRED EMBODIMENT

An embodiment of the present invention is hereinafter described with reference to the drawings. In the present embodiment, a heavy-duty tire for a truck or bus is taken as an example. It is to be noted, however, the present invention is not limited thereto.

Figure 1:
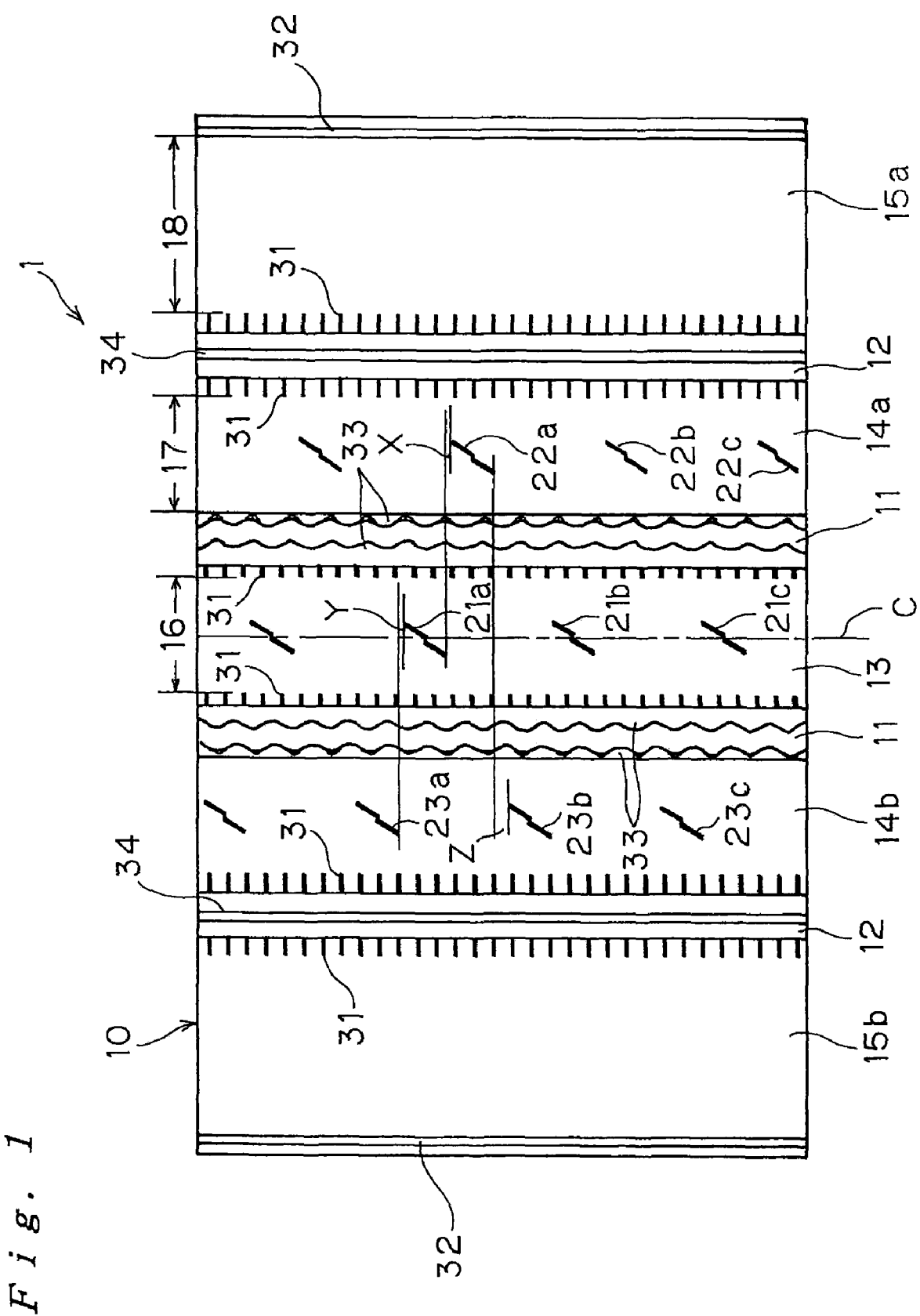
FIG. 1 is an expanded plan view of a tread pattern according to one embodiment of the present invention.
Figure 2:
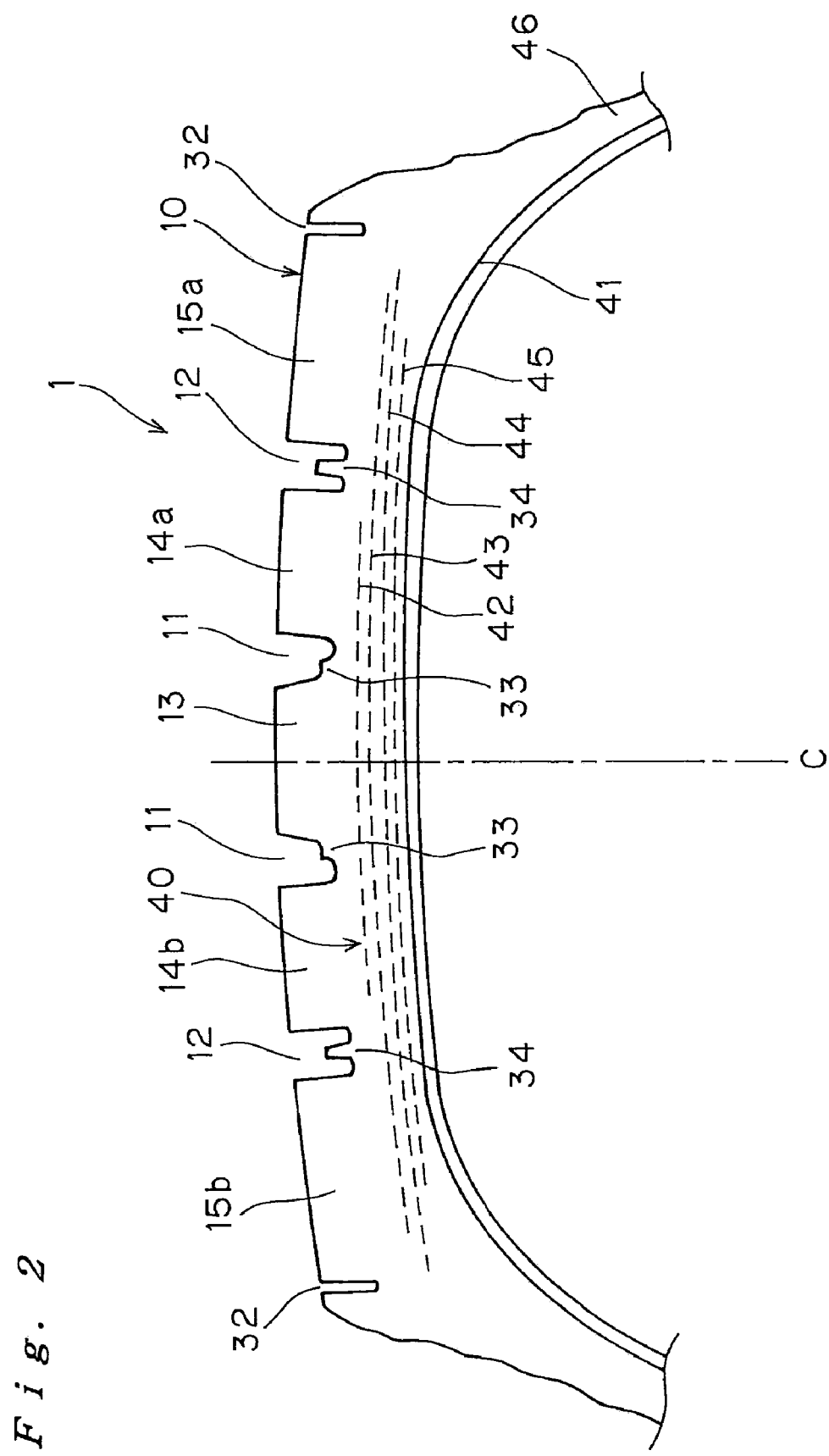
FIG. 2 is a lateral cross section of the tread.
Figure 3:
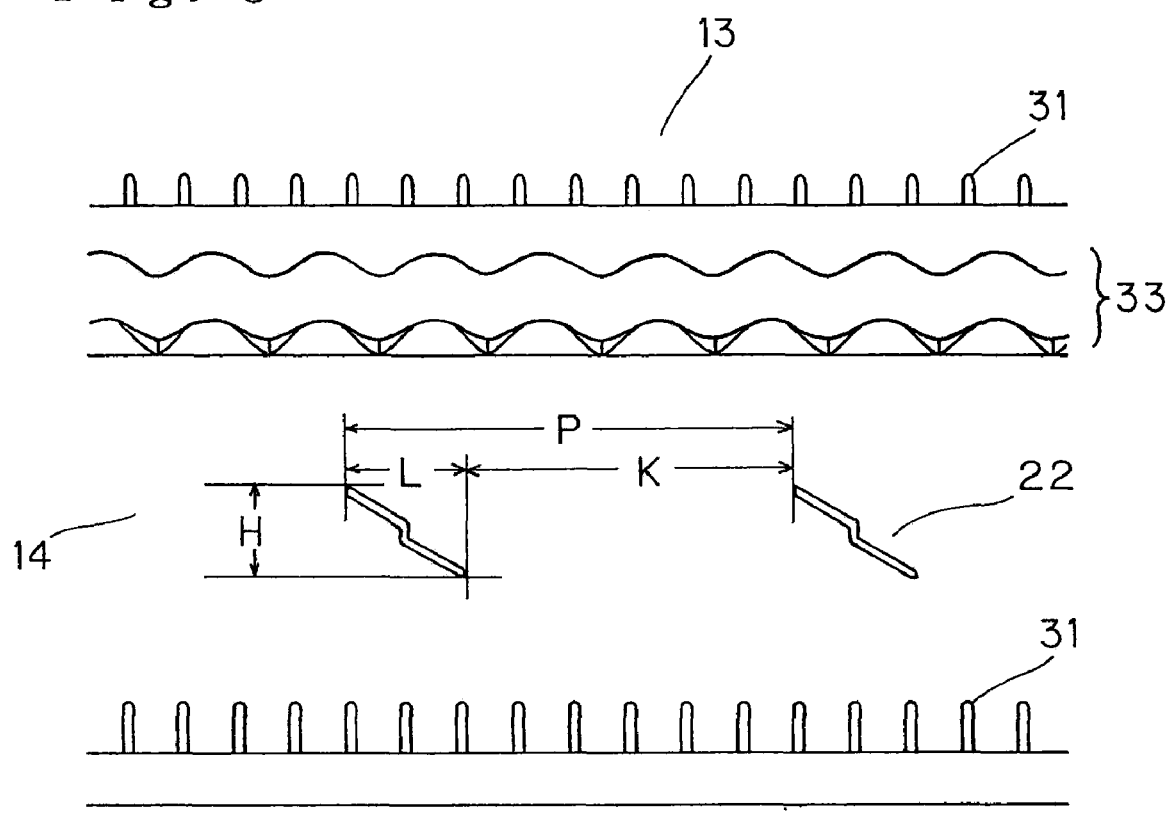
FIG. 3 is a fragmentary enlarged view of the tread pattern shown in FIG. 1.

FIG. 1 is an expanded plan view of a tread pattern for a pneumatic tire 1 (hereinafter may be referred simply as the tire) having size 295/75R22.5, the tire being according to one embodiment of the present invention. FIG. 2 is a lateral cross section of the tread. FIG. 3 is a fragmentary enlarged view of the tread pattern shown in FIG. 1.

Referring next to FIG. 2, the tire 1 is a pneumatic radial tire having a general internal construction and includes a radial carcass 41, a belt 40, a tread 10 surrounding the outer surface of the belt 40, and a sidewall 46 continuous with the tread 10. The carcass 41 is made of a single steel cord ply engaged to the bead cores of a pair of beads. The belt 40 consists of four steel cord plies 42, 43, 44, and 45 disposed in the crown of the carcass 41. Detailed description of this radial tire is omitted.

Referring back to FIG. 1, the tread 10 is partitioned into a center rib 13 located on an equator line C in the center of the tread 10, intermediate ribs 14a and 14b (hereinafter may be collectively indicated by 14) located on both outer sides of the center rib 13, and shoulder ribs 15a and 15b (hereinafter may be collectively indicated by 15) located outside the intermediate ribs 14a and 14b, respectively, by four main grooves 11, 12 extending continuously linearly in the circumferential direction of the tread. The ribs 13, 14, and 15 form lands which are continuous circumferentially of the tire.

Zigzag closed sipes 21a, 21b, 21c, and so on (hereinafter may be collectively indicated by 21) are formed in the lateral center of the center rib 13 (i.e., when viewed widthwise of the tire) and spaced apart from each other circumferentially of the tire. Similarly, zigzag closed sipes 22a, 22b, 22c, . . . (hereinafter may be collectively indicated by 22), 23a, 23b, 23c, . . . (hereinafter may be collectively indicated by 23) are formed in the lateral centers of the intermediate ribs 14a and 14b and spaced apart from each other circumferentially of the tire.

All of the closed sipes 21, 22, and 23 extend at an angle to the circumferential direction of the tire. Both ends of each sipe terminate within the corresponding rib regions. Compressive deformation of the ribs is absorbed by these closed sipes. Consequently, motion of the ends of the ribs is limited further.

The closed sipes 21, 22, and 23 that are located in the lateral centers of the ribs 13, 14a, and 14b are formed in regions that are 20-30% of the actual width of each rib excluding short sipes 31 located in ridgeline portions of the ribs. This secures rigidity of unsiped regions located on both sides of each rib, the unsiped regions having none of the closed sipes 21-23. Consequently, deformation of the ribs can be suppressed. If the above-described unsiped regions exceeded 30%, the sipes would be opened by shearing force, deteriorating the rib rigidity. This would promote wear. If the unsiped regions were 20% or less, the road holding capability of the central regions of the ribs would decrease.

In the illustrated example, the closed sipes 21, 22, and 23 assume a zigzag form. The sipes may also assume a linear form, wavy form, or other form. No restriction is imposed on the form. The closed sipes may all be identical or different in shape among the ribs 13, 14a, and 14b. However, where at least closed sipes of the same shape are formed circumferentially of the same rib, the rib rigidity is made uniform. This is desirable to prevent uneven wear.

The closed sipes 21, 22, and 23 formed in the ribs 13, 14a, and 14b are preferably tilted all in the same direction at an angle of about 15 to 45°, for example, with respect to the circumferential direction of the tire. During operation of the tire, the contact pressure on the road is reduced, and the road holding capability can be improved. This is advantageous in improving the wear resistance.

In the example of FIG. 1, the closed sipes 21, 22, and 23 are formed in the center rib 13 and intermediate ribs 14, respectively. The shoulder ribs 15 may also be provided with closed sipes.

The closed sipes 21 in the center rib 13 and the closed sipes 22 in the intermediate ribs 14 are formed circumferentially of the tire and successively offset circumferentially among the ribs, forming a periodic pattern. More specifically, the closed sipe 22a in the intermediate rib 14a, the closed sipe 21a in the center rib 13, and the closed sipe 23a in the intermediate rib 14b together form one repeating unit of the periodic pattern. The unit of the pattern is repeated circumferentially of the tire. Thus, the closed sipes are regularly arranged in the three ribs.

In the tire 1 of the present invention, it is important that the closed sipes 21, 22, and 23 in the center rib 13 and intermediate ribs 14a, 14b, respectively, be so arranged that when these sipes 21-23 are optically projected onto the equator line of the tire, the closed sipes 21a, 22a, and 23a in one repeating unit of the periodic pattern are offset circumferentially of the tire among the ribs. That is, one repeating unit of the periodic pattern of closed sipes is now described. As shown in FIG. 1, a gap X is formed between the lower end of the closed sipe 21a in the center rib 13 and the upper end of the closed sipe 22a in the intermediate rib 14a. In this gap X, the sipes 21a and 22a do not overlap in the circumferential direction. A gap Y is formed between the upper end of the closed sipe 21a in the center rib 13 and the lower end of the closed sipe 23a in the intermediate rib 14b. In the gap Y, the sipes 21a and 23a do not overlap in the circumferential direction. A gap Z is formed between the lower end of the closed sipe 22a in the intermediate rib 14a and the upper end of the closed sipe 23b in the intermediate rib 14b. In the gap Z, the sipes 22a and 23b do not overlap in the circumferential direction.

Preferably, in one repeating unit of the periodic pattern of the closed sipes 21-23 arranged in the respective ribs, the sum of the circumferential lengths of the regions occupied by the closed sipes 21-23 which are offset circumferentially of the tire among the ribs is 20% or less of the length of the one repeating unit of the pattern of the closed sipes.

If the sum of the circumferential lengths of the regions where the sipes 21-23 do not overlap exceeds 20% of the length of the one repeating unit of the periodic pattern of the sipes, it is difficult to improve the road holding capability by the closed sipes 21-23. In order to improve the wear resistance, it is desirable to reduce the regions where the closed sipes 21-23 are not present. However, it is desirable to arrange the closed sipes with slight gaps between them because of the issues with fabrication of the tire mold (described later). In an ordinary method of fabricating a mold, if the sum of the gaps is about 5% of the length of the outer surface of the tire, then satisfactory results are obtained. Depending on the technique of fabricating the mold, it is possible to set the sum of the gaps to 0%.

In this way, the closed sipes 21, 22, and 23 are formed in the lateral centers of the ribs 13, 14a, and 14b, respectively. The closed sipes 21-23 are offset among the ribs 13, 14a, and 14b. Consequently, variations in rigidity within the tread surface in the circumferential direction of the tire are suppressed and made uniform. The road holding capabilities of the ribs are improved by forming the closed sipes 21, 22, and 23 in the ribs, respectively. The regions not provided with the closed sipes act to mitigate deformation of the ribs, as well as the regions provided with the sipes. The wear resistance can be improved by reducing the contact pressure on the road in front and behind the closed sipes in the circumferential direction.

No restrictions are imposed on the dimensions of the closed sipes 21-23 because the dimensions differ according to the tire size. For example, in a large-sized tire of size 295/75R22.5 of the present embodiment, the wear resistance can be maximally improved by setting the circumferential length L of each closed sipe to about 10 mm and setting the pitch P (one repeating unit) of the periodic pattern of the closed sipes to about 30 to 40 mm. If this pitch is too small, the rib rigidity deteriorates, promoting wear. The width of each sipe is about 0.3 to 2.5 mm. Especially, widths of about 0.5 to 1.5 mm are advantageous.

Where the closed sipes are formed in the three ribs of the present embodiment, setting the length L of each of the closed sipes 21-23 in the ribs 13, 14a, and 14b to one-third of the pitch P of the periodic pattern of the closed sipes maximally improves the wear resistance. That is, the closed sipes 21-23 in the ribs are preferably arranged without any gap or overlap between them; the above-described gaps X, Y, and Z are all 0 mm.

However, an ordinary tire vulcanization mold uses a mold split into 6 to 10 parts as a mold for forming a designed surface of the tread. Because of the strength of the mold and manufacturing considerations, the closed sipes need to be located off the ends of the split parts of the mold. Where the tolerance to which the mold is manufactured (tolerance to which sipe blades are buried) is taken into consideration, it is desirable to arrange the closed sipes with slight gaps therebetween.

With respect to the closed sipes 21, 22, and 23, the ratio (L/H) of the length L of each sipe in the circumferential direction of the tire to the lateral length H is preferably in a range of 1 to 2. Decrease in the contact pressure on the road of the regions where the closed sipes are present and suppression of variations in rigidity in the regions where the sipes are not present can both be accomplished. Hence, the wear resistance can be improved further.

Examples of the dimensions of the sipes 22 of the above-described tire size are shown in FIG. 3. The length (L) of each sipe is 9.63 mm. The width (H)=6.86 mm. The pitch (P)=34.56 mm. The sipe spacing (K)=24.93 mm. L/H=1.4.

The depth of the closed sipes 21-23 can be set to 0.5 to 0.9 times the depth of the main grooves 11 and 12. If the closed sipes are deeper than the main grooves, the rigidity of the ribs decreases. As a result, uneven wear tends to occur from the initial phase of use.

Preferably, in the tire 1, the closed sipes 21, 22, and 23 are successively offset circumferentially of the tire in the direction in which the belt cords of the outermost-layer belts 42 of the tire 1 extend in one repeating unit of the periodic pattern of the sipes 21-23. The line interconnecting both ends of each of the sipes 21-23 intersects the direction in which the outermost-layer belt cords extend.

Where the belt cords in the outermost layer and the closed sipes 21-23 extend in the same direction, when tire inflation pressure is created, the spacing between the cords increases. As a result, the sipes tend to deform in the direction to increase the depth of the sipes. However, because the belt cords in the outermost layer are designed to extend in a direction intersecting the sipes 21-23, if the spacing between the belt cords increases, deformation of the sipes yields less effects. This is advantageous in retaining the crack resistance.

Usually, steel cords such as 3×0.20+6×0.35, 3+9+15×0.22 (+1) structures are used as the belts of the tire 1. So-called high-elongation cords such as 4×2×0.23 and 1×5×0.35 which are excellent in cut resistance where the outer surface of the tread is damaged may be used as the belts in the outermost layer. Normally, steel cords are arrayed at a given density, and three or four layers of belt plies are laminated. The cords are arranged at an angle of 15 to 35° to the equator line C. The belts in the innermost layer adjacent to the carcass layer may be used at an angle of 50 to 65°.

Where the above-described high-elongation cords out of the above-described cords are used as the belt cords in the outermost layer, the inside pressure tends to increase the cord spacing. Therefore, where the directions of the belt cords and sipes intersect each other, it is easy to suppress deformation of the sipes.

In the pneumatic tire 1 constructed as described so far, the actual rib widths 16, 17, and 18 excluding the multiple short sipes 31 arranged along the ridgelines of the center rib 13, intermediate ribs 14, and shoulder ribs 15 are preferably so set that the actual rib width 17 of the intermediate ribs 14 on both sides of the center rib 13 is 95 to 105 and that the actual rib width 18 of the shoulder ribs 15 is 140 to 160, assuming that the actual rib width 16 of the center rib 13 is set to 100.

Consequently, the rigidity of the shoulder ribs 15 is enhanced, and deformation of the shoulder ribs is suppressed. The contact pressure of the shoulder ribs 15 on the road is made uniform. Progress of uneven wear from the outside is prevented. Furthermore, when the tire mounts and dismounts a curb or the like, eruption of cuts in the ribs or eruption of cracks from the bottoms of the thin grooves can be effectively prevented. The rib area ratio is stipulated in terms of the actual rib width for the following reason. Where the numerous short sipes 31 are arranged along the rib ridgelines, the rigidity decreases in these local areas where the sipes 31 are disposed. The contribution to the wear resistance drops.

It is known that with respect to the short sipes 31 which are arranged in large numbers circumferentially of the tire and which open to the rib ridgelines, if slippage occurs in rib end portions due to shearing force when the tire touches the road, the response to the slipping force is improved, and that this eliminates slippage and prevents uneven wear of the rib end portions.

The tire 1 can be provided with thin grooves 32 extending circumferentially near the outer rib edges 15 on both sides. Where the thin grooves 32 are formed and the grooves 32 are made deeper than the main grooves 12, the rib portions located outside the thin grooves 32 have decreased rigidity and thus when deformation occurs, these outer rib portions will wear early. This suppresses progress of uneven wear to the shoulder ribs 15.

Where zigzag cuts 33 that are shallower than the main grooves are formed in large numbers in the groove walls of the ribs 13 and 14, a zigzag form appears as wear grows during operation. Consequently, on wet roads, driveability and controllability can be secured.

Where ridges 34 extending longitudinally of the main grooves 12 are formed in the centers of the bottoms of the grooves 12, if pebbles from a road surface are about to enter the grooves, the ridges 34 hinder intrusion of the pebbles, thus decreasing stone retention.

EXAMPLES

Specific examples of the present invention are described in detail below.

Tires according to the present invention were prototyped as examples of the invention. Each of these tires had a tread pattern shown in FIG. 1 and zigzag closed sipes shown in FIG. 3. A comparative example having the same tread pattern as the pattern of the examples of the invention was also prototyped. The specifications (including the dimensions of the closed sipes and their arrangement) of the comparative example were modified as listed in Table 1. These tires were evaluated in terms of performance.

Each tire was a radial tire having tire size 295/75R22.5. Steel cords of 3+8×0.22 mm were struck into the carcass plies at a density of 30/50 mm. Steel cords of 3×0.20+6×0.35 mm were struck into the belt plies from the innermost layer adjacent to the carcass layer to the third layer at a density of 25/50 mm. High-elongation steel cords of 1×5×0.35 mm were struck into the belts in the outermost layer at the same density of 25/50 mm. The longitudinal directions of the belt cords were set as follows. In FIG. 1, the belt cords in the innermost layer ascended in the leftward direction. The belt cords in the second layer ascended in the rightward direction. The belt cords in the third layer ascended in the leftward direction. The belt cords in the outermost layer ascended in the leftward direction.

The width of the main grooves 11 and 12 was 11 mm, and their depth was 12 mm. The actual widths of the center rib and intermediate ribs were 26 mm. The actual width of the shoulder ribs was 39.4 mm. The sipes in all the ribs were shaped identically. All the sipes had a depth of 8 mm.

The prototyped tires were mounted to the front wheels (steering road wheels) of a tractor (2-D), and the tractor was made to travel in practice. The uneven wear resistance characteristics of the rib end portions were evaluated.

The uneven wear resistance characteristics were evaluated by causing the tires to travel a distance of 160,000 km, measuring the area of river wear produced along the ends of the center ribs and the ends of the intermediate ribs of each tire, and taking the average value of the river wear areas of the two front tires. The results are shown in Table 1; the river wear area in the tire of comparative example 1 was set to index 100. Accordingly, a type having a smaller value has higher uneven wear resistance performance.

To evaluate the effectiveness of the process step in which a tire vulcanization mold was used, it was evaluated whether early damages to the sipe blades (e.g., detachment of the blades, chips, and bending) existed when 1,500 tires were vulcanized.

TABLE 1

| | | Example 1 | Example 2 | Example 3 | Example 4 | Example 5 | Example 6 | Example 7 | Example 8 | Example 9 | Comparative Example 1 |
|---|---|---|---|---|---|---|---|---|---|---|---|
| Circumferential sipe length (L) | mm | 9.63 | 9.63 | 9.63 | 9.63 | 6.17 | 14.41 | 9.63 | 9.63 | 9.63 | 9.63 |
| Widthwise sipe length (H) | mm | 6.86 | 6.86 | 6.86 | 6.86 | 6.86 | 6.86 | 4.94 | 8.06 | 6.86 | 6.86 |
| Sipe pitch (P) | mm | 34.56 | 31.20 | 30.05 | 35.25 | 21.47 | 50.15 | 34.56 | 34.56 | 34.56 | 26.00 |
| L/H | | 1.4 | 1.4 | 1.4 | 1.4 | 0.9 | 2.1 | 1.4 | 1.4 | 1.4 | 1.4 |
| Unsiped regions | % | 16.4 | 8.0 | 4.0 | 22.0 | 16.0 | 16.0 | 16.4 | 16.4 | 16.4 | 0 |
| Overlap of sipes between ribs | | none | none | none | none | none | none | none | none | none | present |
| Width of sipe to rib width | % | 26 | 26 | 26 | 26 | 26 | 26 | 19 | 31 | 26 | 26 |
| Sipe direction and belt direction (*1) | | different | different | different | different | different | different | different | different | identical | different |
| Uneven wear (river wear) | index | 83 | 85 | 93 | 96 | 98 | 94 | 97 | 93 | 95 | 100 |
| Early damages to sipe blades | | none | none | present | none | none | none | none | none | none | present |

(*1): relationship between sipe direction and direction of belt cords in the outermost layer in one repeating unit of the periodic pattern It can be seen from Table 1 that in the tires of the examples of the present invention, eruption of river wear has been effectively suppressed.

According to the present invention, variations in rigidity of the ribs within the tread surface are suppressed. Sufficient rib rigidity is secured. The road holding capability is improved by closed sipes formed in the ribs. In this way, pneumatic tires having excellent wear resistance are offered. Especially, in the tires, eruption of uneven wear is suppressed.

Pneumatic tires of the present invention can be applied to various sizes and various applications ranging from passenger-car tires to heavy-duty tires for trucks and buses, irrespective of whether the wheels are steering wheels or driving wheels. Especially, tires of the present invention can be suitably applied to front steering road wheels of large vehicles such as trucks, buses, and tractors.

What is claimed is:

1. A pneumatic tire including a tread surface having five ribs partitioned by four main grooves extending continuously circumferentially of the tire;
    wherein said ribs include a center rib located on a tire's equator line and intermediate ribs located on opposite sides of the center rib;
    wherein closed sipes are formed on an outer surface of the tire and at least in the center rib and in the intermediate ribs, each of the closed sipes being located in a lateral center of a corresponding one of the ribs, each of the closed sipes having both ends terminating within a corresponding one of the ribs, the closed sipes being successively offset circumferentially at given intervals among the ribs, the closed sipes being formed in a periodic pattern;
    wherein the closed sipes in the ribs are so arranged that when the sipes are optically projected onto the equator line of the tire, the sipes do not overlap circumferentially of the tire among the ribs; and
    wherein in one repeating unit of the periodic pattern of the closed sipes, the sum of circumferential lengths of regions where the closed sipes do not overlap circumferentially of the tire among the ribs is 20% or less of the length of the one repeating unit of the pattern of the closed sipes.

2. The pneumatic tire as set forth in claim 1, wherein each of the closed sipes is formed in a region that is 20 to 30% of an actual width of a corresponding one of the ribs.

3. The pneumatic tire as set forth in claim 1, wherein a ratio of a length of each of the closed sipes as measured circumferentially of the tire to a length of each of the closed sipes as measured width of the tire is in a range of from 1 to 2.

4. The pneumatic tire as set forth in claim 1, wherein all the closed sipes are tilted in the same direction in their respective ribs with respect to the circumferential direction of the tire.

5. The pneumatic tire as set forth in claim 4, wherein the closed sipes are successively offset in the circumferential direction of the tire and in a direction in which belt cords in an outermost layer of the tire extend in said one repeating unit of the periodic arrangement of the closed sipes, and wherein a line interconnecting both ends of each of the sipes intersects the direction in which the belt cords in the outermost layer extend.

6. The pneumatic tire as set forth in claim 1, wherein in one repeating unit of the periodic pattern of the closed sipes, the sum of circumferential lengths of regions where the closed sipes do not overlap circumferentially of the tire among the ribs is 5% or less of the length of the one repeating unit of the pattern of the closed sipes.

7. The pneumatic tire as set forth in claim 1, wherein pitch P (one repeating unit) of the periodic pattern of the closed sipes is set to about 30 to 40 mm.

* * * * *